United States Patent
Von Elbwart et al.

(10) Patent No.: US 7,894,401 B2
(45) Date of Patent: Feb. 22, 2011

(54) METHOD OF DETERMINING FEEDBACK IN A COMMUNICATION SYSTEM

(75) Inventors: Alexander Golitschek Edler Von Elbwart, Darmstadt (DE); Eiko Seidel, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 955 days.

(21) Appl. No.: 10/534,044

(22) PCT Filed: Nov. 7, 2002

(86) PCT No.: PCT/EP02/12440

§ 371 (c)(1),
(2), (4) Date: Nov. 17, 2005

(87) PCT Pub. No.: WO2004/042988

PCT Pub. Date: May 21, 2004

(65) Prior Publication Data

US 2008/0123578 A1    May 29, 2008

(51) Int. Cl.
H04B 7/216      (2006.01)
H04B 1/00       (2006.01)
H04W 72/00      (2009.01)
H04W 4/00       (2009.01)
H04B 17/00      (2006.01)

(52) U.S. Cl. .................. 370/335; 370/332; 455/69; 455/226.1; 455/452.2

(58) Field of Classification Search ............ 455/69, 455/67.11, 66.1, 550.1, 226.1, 226.2, 226.3, 455/226.4, 452.2; 370/332, 333, 335
See application file for complete search history.

(56) References Cited

U.S. PATENT DOCUMENTS

| | | | |
|---|---|---|---|
| 5,581,481 A | 12/1996 | Weerackody | |
| 5,671,156 A | 9/1997 | Weerackody | |
| 5,729,560 A | 3/1998 | Hagenauer et al. | 370/347 |
| 5,982,766 A | 11/1999 | Nystrom et al. | 714/786 |
| 6,148,208 A * | 11/2000 | Love | 455/442 |
| 6,385,462 B1 * | 5/2002 | Baum et al. | 455/522 |
| 6,792,470 B2 | 9/2004 | Hakenberg | |
| 7,043,210 B2 * | 5/2006 | Zhu et al. | 455/102 |
| 2002/0087716 A1 * | 7/2002 | Mustafa | 709/236 |

FOREIGN PATENT DOCUMENTS

DE    3443041    5/1986

(Continued)

OTHER PUBLICATIONS

Japanese Office Action dated Jan. 8, 2008 with English translation thereof.

(Continued)

Primary Examiner—Un C Cho
(74) Attorney, Agent, or Firm—Dickinson Wright PLLC

(57) ABSTRACT

A method of determining feedback in a communication system, wherein data is transmitted from a transmitter to a receiver, and in response to data reception at the receiver, feedback is generated based on the received data comprising the step of classifying the data into data entities of different levels of importance and the step of determining feedback based on at least one data entity of one level of importance. The invention further relates to a corresponding receiver, transmitter and a respective communication system.

31 Claims, 6 Drawing Sheets

FOREIGN PATENT DOCUMENTS

| | | |
|---|---|---|
| EP | 0735774 | 10/1996 |
| EP | 1143635 | 10/2001 |
| JP | 8-289295 | 1/1996 |
| JP | 2001-274861 | 10/2001 |
| JP | 2002-141964 | 5/2002 |

OTHER PUBLICATIONS

Chinese Office Action dated Dec. 10, 2007 with English translation thereof.

PCT International Search Report dated Jul. 30, 2003.

"Enchanced HARQ Method with Signal Constellation Rearrangement," TSG-RAN Working Group 1 Meeting #19,XX,XX, No. 19, Feb. 27, 2001, XP002229383, pp. 1-11.

L. C., Yun, et al.; "Power Control for Variable QOS on a CDMA Channel," Military Communications Conference, 1994, MILCOM '94, Conference Record, 1994 IEEE Fort Monmouth, NJ, USA Oct. 2-5, 1994, New York, NY, USA, IEEE, US, Oct. 2, 1994, XP010149801, ISBN: 0-7803-1828-5, pp. 178-182.

* cited by examiner

METHOD OF DETERMINING FEEDBACK IN A COMMUNICATION SYSTEM

FIELD OF THE INVENTION

The invention relates to a method of determining feedback in a communication system, wherein data is transmitted from a transmitter to a receiver and in response to data reception at the receiver, a feedback is generated based on the received data for back transmission to the transmitter. Furthermore, the invention relates to a corresponding receiver and transmitter as well as to a communication system adapted to carry out such method.

Although the invention is not restricted to a wireless multicast transmission system, it is particularly applicable to systems that require multicast feedback information from one of a plurality of multicast receivers.

BACKGROUND OF THE RELATED ART

As shown in FIG. 1, a wireless communication system with multicast transmission comprises generally one data transmitter and multiple data receivers that receive data from the multicast transmitter. The data is transmitted simultaneously to all receivers using the same radio resource (e.g. logical data channel, physical data channel) but the quality of the received signal is generally not identical for all receivers. Some sort of feedback can be provided from the multicast receivers to the multicast transmitter.

There are many analogies between wireless and TCP/IP multicast scenarios. For more information on multicasting, it can be referred to Murhammer, Atakan, Bretz, Pugh, Suzuki, Wood, "TCP/IP Tutorial and Technical Overview", 6th edition, Prentice-Hall, Upper Saddle River, N.J.: Chapter 2.1.4.2.

Feedback in multicast wireless systems can be used in various ways, for example:
- The feedback can signify the positive or negative acknowledgement to the data reception;
- The receivers convey information about the quality of the radio link;
- The receivers request certain actions or procedures from the transmitter for data transmission, e.g. increase transmit power, improve coding gain, lower data rate etc.

Such feedback is transmitted either from each multicast receiver or from only one designated multicast receiver, as known for example from US 2001/0046875 and EP 1 143 635.

The transmission of feedback is of course dependant on the design of the communication system. As an example, feedback can be transmitted periodically after a certain time interval has elapsed. Alternatively, the feedback is transmitted as a reaction to a certain event, such as a number of consecutive errors. Those skilled in the art will easily identify a huge variety of possibilities exceeding the aforementioned modes.

Sometimes the multicast data does not have to be received error-free in all receivers to satisfy the customer. For example, in the transmission of video data, the customer might still be satisfied if a sufficient number of video frames is received in good condition. There exist also transmission systems where part of the data is of higher importance than other data. An example is the MPEG standard, where generally the so-called I-pictures are of higher importance than P- or B-pictures (for further details, see Mitchell, Pennebaker, Fogg, LeGall, "MPEG Video Compression Standards", Chapman & Hall, New York N.Y., 1997: Chapter 2.3.1).

Moreover, a high amount of feedback, which is signalled from the receiver to the transmitter generally decreases the data throughput efficiency. Hence, it is desired to decrease the feedback to the absolute minimum sufficient to satisfy a certain quality of service (QoS) for a customer.

In addition, by focusing on the delivery of important data, the link budget (e.g. power allocation, error resilience) can be exploited more efficiently. This will have a positive effect on the whole network (e.g. cell in a wireless network), as e.g. interference can be reduced.

SUMMARY OF THE INVENTION

It is therefore the object of the present invention to provide a method, receiver, transmitter and communication system, which is able to decrease the amount of feedback resulting in an increase in overall data throughput efficiency. Another object is to provide a method, receiver, transmitter and communication system, which is able to throughput efficiency. These objects are solved by a method, receiver, transmitter and communication system according to the independent claims.

For convenience, the terms "Importance" and "Service Requirements" are used hereafter in the following sense:

"Importance" is a coarse classification of data, belonging to a service, into one or more levels, depending on how crucial the data is for the receiver to be satisfied by the given service.

"Service Requirements" denotes a set of requirements for a service that is to be provided to the receiver such that the user is satisfied. This can be for example predefined for a given service, or could also be negotiated/signalled between transmitter and receiver for a given connection. As an example, the service requirements for a video transmission service can comprise a minimum display rate of 10 images per second at a resolution of 160×100 video pixels, where the shift between audio and video data is no more than 10 milliseconds.

The invention provides a teaching on how feedback should be determined in a communication system, where the data consists of multiple levels of importance. To this end, the data is classified into data entities of different levels of importance and the feedback is determined based on at least one data entity of one level of importance. Preferably, the step of classifying the data entities includes determining which data entities are required and/or optional to satisfy a particular service requirement for a customer.

According to a preferred embodiment, the levels of importance are predetermined or conveyed during set-up of the transmission.

According to a variant of the method, the levels of importance are dynamically varied during transmission and signalled from the transmitter to the receiver. This is of particular interest if parameters such as link condition, data rate, or service requirements vary during transmission.

Preferably, the data entities of different levels of importance are assigned hierarchical parts of the data transmission. In that way, only higher important parts are used to determine the feedback. Hierarchical parts of the data transmission is meant to denote a layered structure of data parts where a second data part is depending on a first data part. In other words, the information of a second data part cannot be evaluated without the information of a first data part.

According to a preferred embodiment, the communication system is a multicast transmission system, comprising at least one data transmitter and multiple data transceivers.

Advantageously, the feedback is transmitted from at least one designated multi-cast receiver, which allows to further minimize the amount of feedback, which is sent back in a multicast system.

In an advantageous embodiment, the invention is applied to a wireless mobile communication system having a plurality of mobile receivers with different qualities of the received data. In such system, preferably the feedback is determined by the multicast receiver experiencing the worst radio link conditions.

Furthermore, the invention preferably uses an MPEG data compression technique to transmit data, comprising frames or pictures having different levels of importance. Thus, only those frames or pictures having a particular level of importance can be used to generate the feedback.

According to a further advantageous embodiment, the feedback either signifies positive or negative acknowledgements of data reception or requests control of at least one of the transmission parameters including transmission power, coding gain, modulation, data rate or error probability. This is beneficial, for instance, for keeping the transmission power within a wireless communication system at a minimum level in order to reduce the interference in radio access schemes, such as CDMA.

BRIEF DESCRIPTION OF THE DRAWINGS

The invention will now be described in further detail with reference to the accompanying figures, which show.

The invention will now be described in further detail with reference to the accompanying figures, which show.

DETAILED DESCRIPTION OF THE INVENTION

In general, any data transmission is suitable for the present invention as long as there exists a multitude of data entities consisting of either one or more required/necessary data entities or one or more additional/optional data entities.

As an illustrative example, MPEG video data is considered in the following transmission. In MPEG data transmission, there exist typically so-called I-, P-, and B-pictures. By definition, I-pictures are compressed independently of other pictures. P- and B-pictures are compressed with reference to other I- or P-pictures. I-pictures are generally of higher importance than P- and B-pictures, and in turn P-pictures are of higher importance than B-pictures. In the present invention, we use the term "minimum required data" to define which part of the data delivers the minimum required data to satisfy a data service or the service requirement requested by the receiver.

Figure 1:
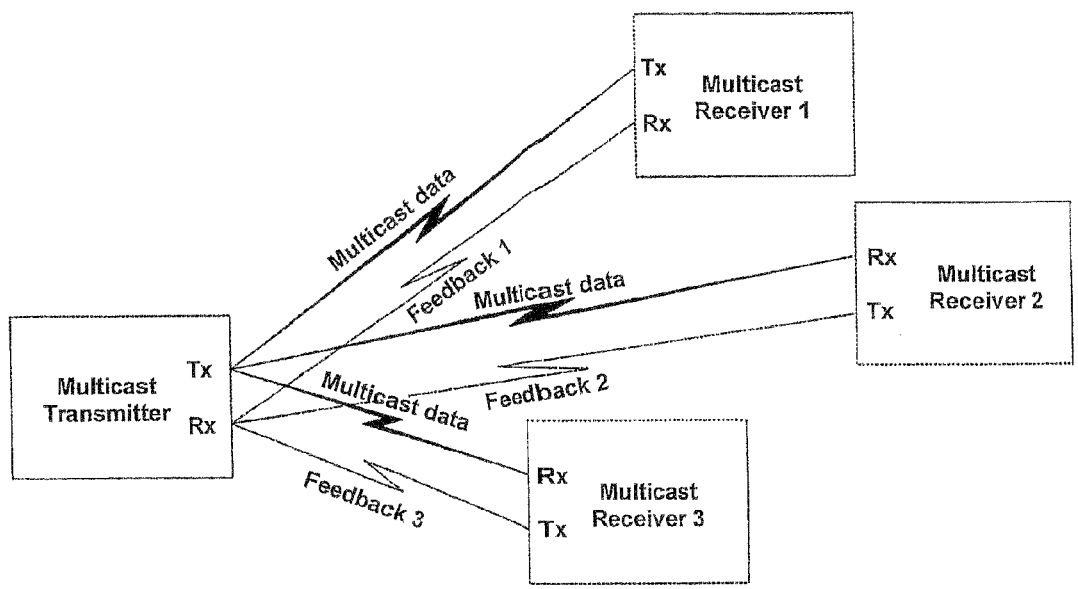
FIG. 1 describes the general constellation of a wireless multicast system to which the present invention can be applied.
Figure 2:
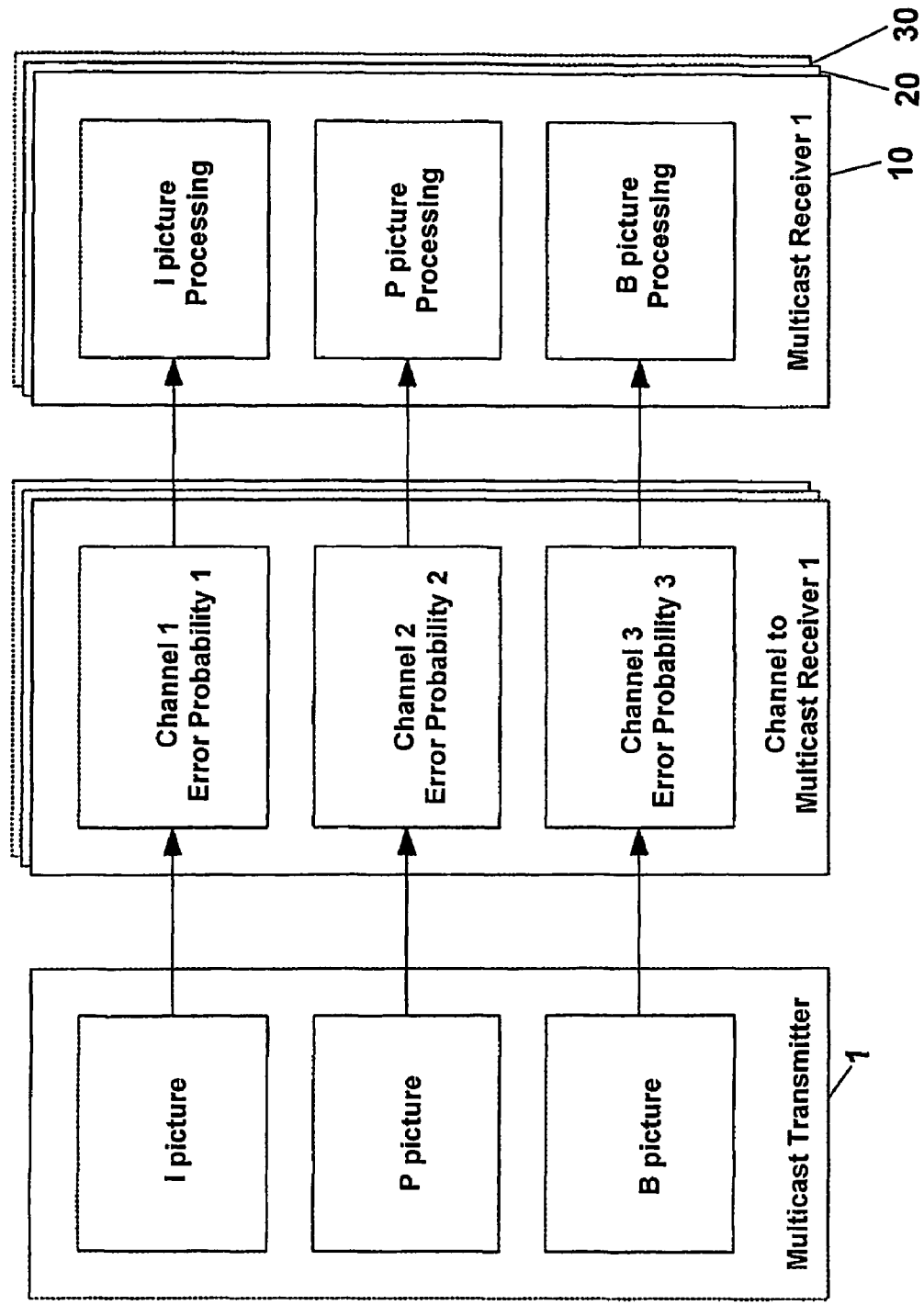
FIG. 2 is a general view of multicast transmission of different importance data.

In FIG. 2, a multicast transmitter 1 transmits data through the channel to a plurality of multicast receivers 10, 20, 30. In the figure, only multicast receiver 10 and respective channels 1 to 3 experiencing a respective error probability 1, 2, 3 are shown completely. The remaining receivers and the respective channels are indicated by the stack of boxes.

In the figure, each of the I-, P- and B-pictures are transmitted through the channels and in the multicast receiver, the received data is separately processed. Although the channels 1 to 3 can be based on the same radio conditions, they may show differences in error probability due to varied transmission parameters such as employed modulation or transmit power for example.

Figure 3:
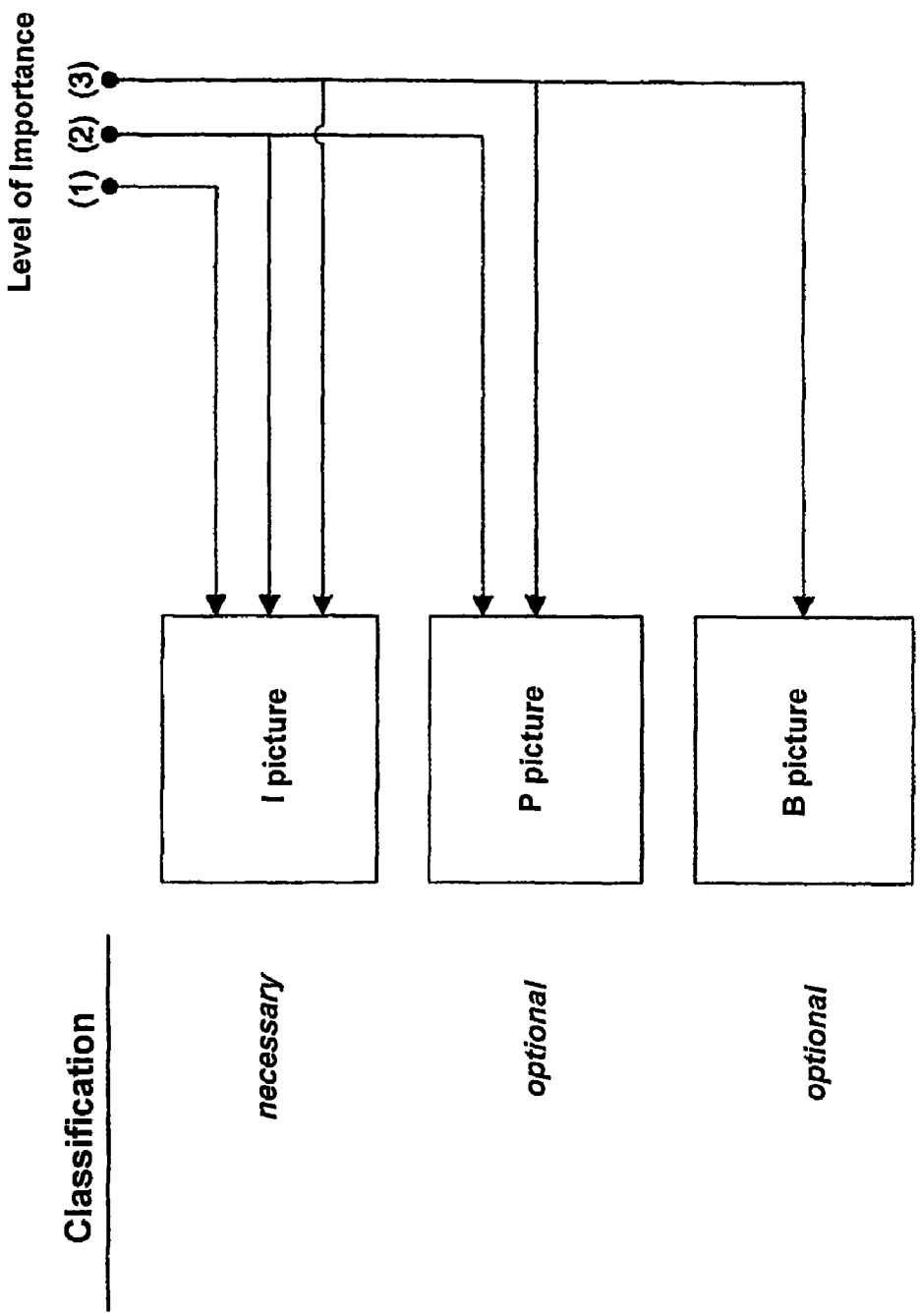
FIG. 3 illustrates the method of the invention by providing an example of importance classifications and settings for MPEG.

FIG. 3 illustrates an example of how the pictures could be classified into necessary/required and additional/optional pictures. Here, the I-pictures are defined as "required/necessary" and consequently receive a level of importance 1. B- and P-pictures are defined as "additional/optional" and receive the respective level of importance 2, respectively 3.

In accordance with the present invention, the multicast receivers determine their feedback information only with respect to the data defined as "required/necessary", meaning the I-pictures having the level of importance 1.

Generally, each importance level data can be defined by a set of requirements, for convenience called Quality of Service (QoS). The feedback is therefore usually determined according to whether a given QoS can be met or not. As an example for requirements within a QoS set, there exist packet error rate, bit error rate, transmission delay, data rate, or packet loss rate, to name but a few.

As an example, feedback could signify either a positive (ACK) or negative acknowledgement (NACK) for a received data packet. Here, only the I-pictures are evaluated for feedback, i.e. there exist only I-pictures ACK and I-pictures NACK.

As a further example, the feedback could be a transmit power change request. The receivers determine the error rate of the data with importance level (1), e.g. I-pictures. If this error ratio exceeds a certain upper threshold, a receiver transmits "power up" as feedback. Conversely, if the error ratio exceeds a certain lower threshold, a "power down" is transmitted as receiver feedback. Looking at FIG. 2 with the previous definition, the multicast receivers would evaluate only the "Error Probability 1" since this is responsible for the I-pictures.

As a further example, the feedback can be used to initiate a power ratio shift between the data entities of the different importance levels. Those data entities belonging to the "required/necessary" class will be transmitted with increased power, while the data entities belonging to the "additional/optional" class will be transmitted with decreased power, in such a fashion that the combined transmitted power of both classes remains unchanged. By this the amount of interference generated by the transmission is kept constant, while the reception quality of the "required/necessary" class data is increased. This will increase the overall user satisfaction for the service. In the same fashion the feedback can be used to decrease the transmit power of the "required/necessary" data while increasing the transmit power of the "additional/optional" data. This is particularly useful if the received quality of the "required/necessary" data exceeds the requirements. It should be noted that the classification of data entities into importance levels is not restricted to well-defined data entity levels as in FIG. 2. As an illustrative example, the classification for importance level (1) could be defined as "all I-pictures plus those three P-pictures that immediately follow an I-picture". Since the classifications should be unambiguous, this implies that importance level (2) then must not contain "those three P-pictures that immediately follow an I-picture".

Although generally the feedback can be sent by all multicast receivers, it is preferred that only one determined multicast receiver is allowed to transmit feedback. According to a preferred embodiment, this is the multicast receiver with the worst radio link conditions.

Although in the example above, it has been focused on MPEG data transmission, the present invention is by no means constrained to this. It should be noted that the classification into "required/necessary" and "additional/optional" itself is system- or service-dependant, and is thus not part of the present invention. Those skilled in the art will find appropriate classifications without considerable difficulties. The application of such an appropriate classification to the system or service however is part of the present invention.

As stated, data of different levels of importance is classified according to the data service that is provided in multicast. This definition can be either assigned for a given service (i.e. I-pictures for MPEG), or can be determined, set and signalled dynamically from the transmitter to the receiver according to varying link parameters.

Figure 4:
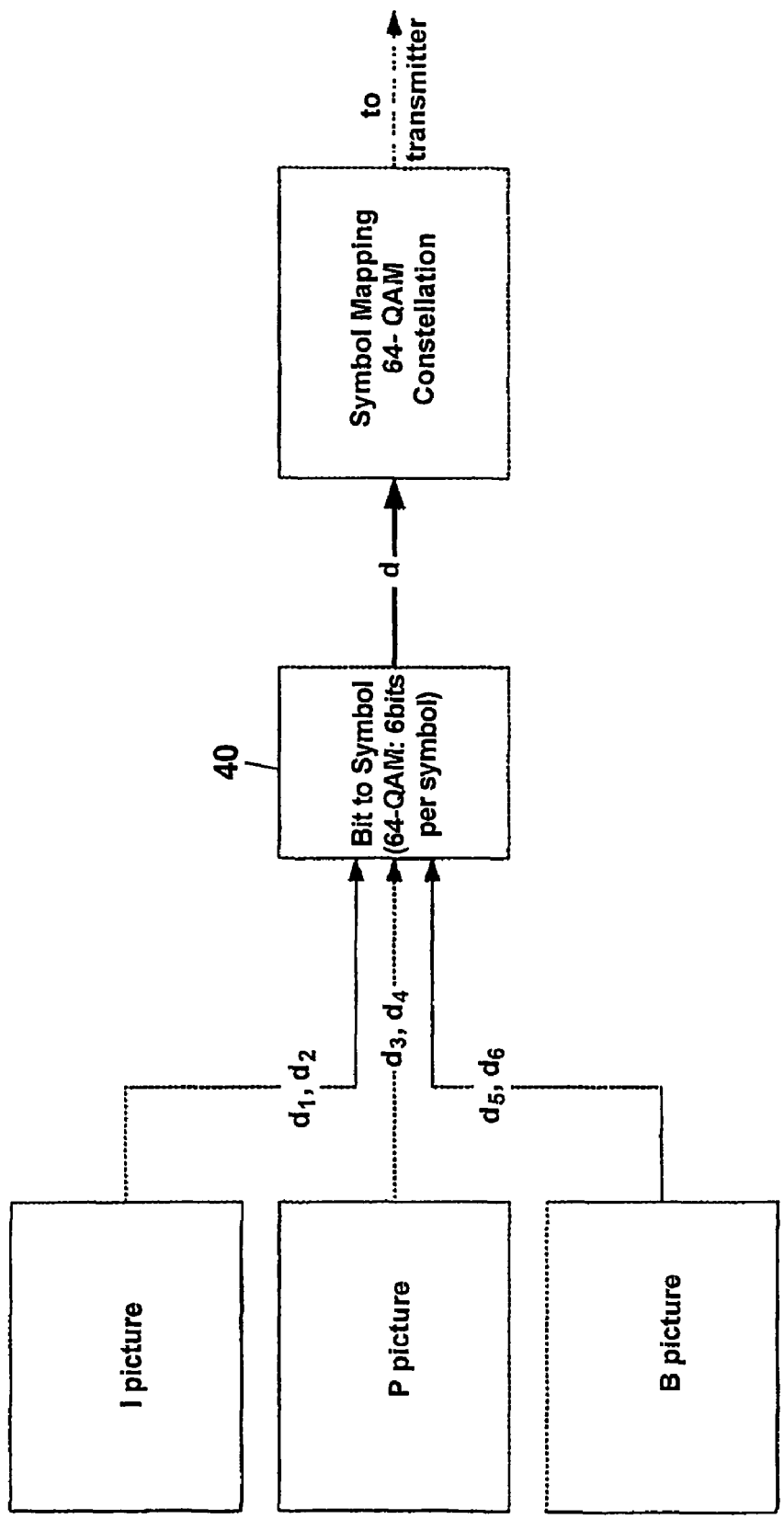
FIG. 4 illustrates a mapping of MPEG pictures using a hierarchical 64QAM.

FIG. 4 illustrates the mapping of MPEG I-, P-, B-pictures using a hierarchical 64 QAM modulation scheme. More specifically, the I-picture data bits $d_1$, $d_2$, the P-picture data bits $d_3$, $d_4$ and the B-picture data bits $d_5$, $d_6$ are input into the modulator 14, using a hierarchical 64-QAM modulation scheme, wherein 6 bits are modulated on one data symbol d. Subsequently, the symbol undergoes symbol mapping using a 64QAM signal constellation scheme before being output by the transmitter over the channel.

Figure 5:
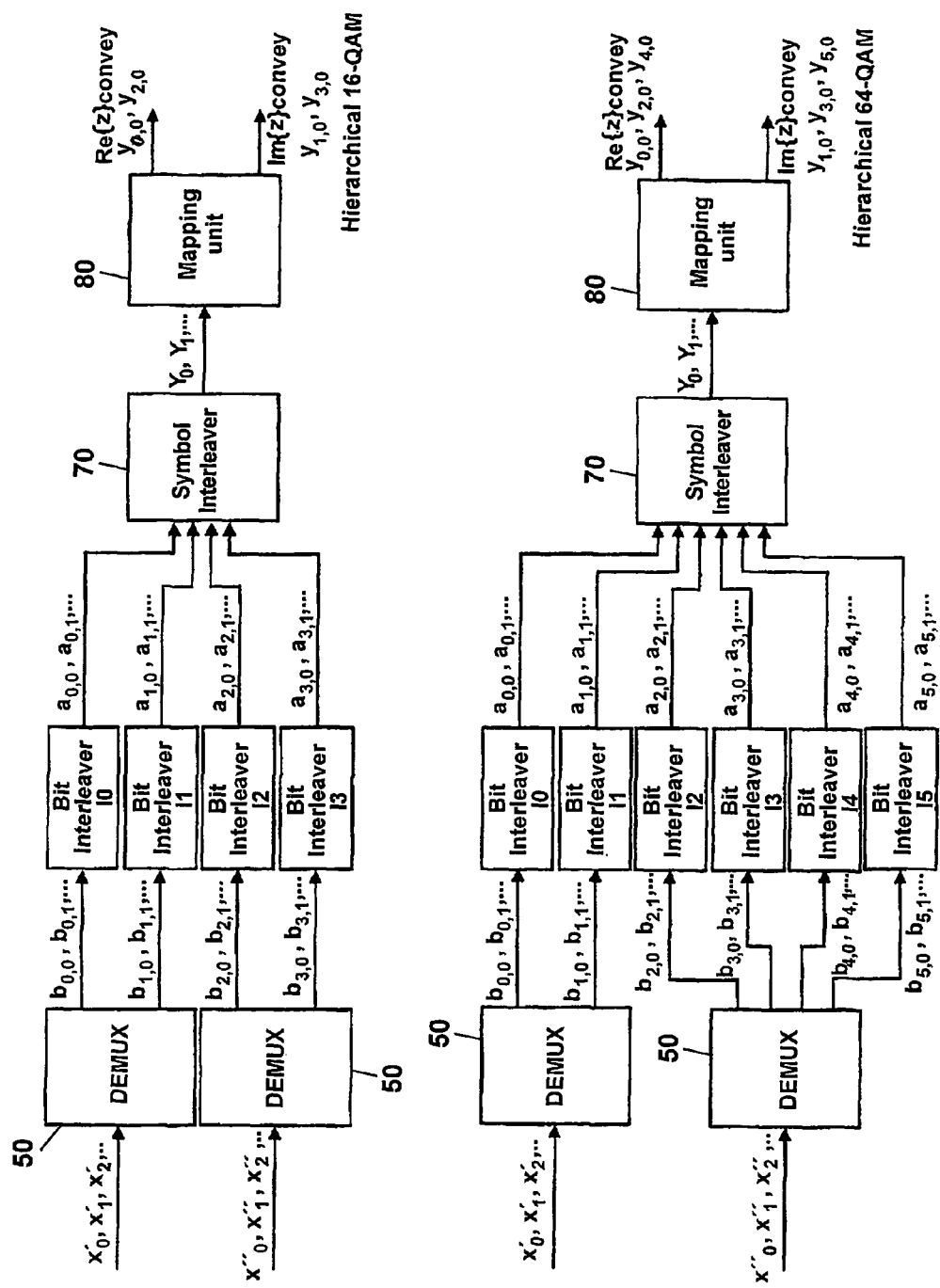
FIG. 5 illustrates a mapping of data for transmission using hierarchical modulation schemes.

The classification defining several levels of importance is not necessarily restricted to one or more of several data entities as outlined for a multicast transmission using MPEG data transmission. In FIG. 5, an alternative transmission scheme is shown using hierarchical transmission modes in multi-level modulation formats in a communication system for digital video broadcasting (DVB), which is standardized according to the European Telecommunications Standard ITS 300744.

As shown in more detail in FIG. 5, for a hierarchical 16-QAM and hierarchical 64-QAM modulation scheme, two data input streams $X'_0, X'_1, X'_2, \ldots$ and $X''_0, X''_1, X''_2$ are input into demultiplexers 50, which output a series of bits that are sent through a plurality of bit interleavers (I0 to I5) having their outputs applied to symbol interleavers 70 and then to mapping units 80.

In order to apply the present invention to the described transmission modes, only the highest hierarchical part of the transmission data, which is denoted as $X'_0, X'_1, X'_2, \ldots$ in the figure, are selected for feedback generation. The feedback is then generated on the data entity having the highest hierarchical part of the transmission data.

Particularly for such hierarchical modulation modes, the previously described method of shifting transmit power ratios can be included into the modulation constellation. As an illustrative example, for the hierarchical 16-QAM shown in FIG. 5, it is assumed that the "required/necessary" data is denoted as $X'_0, X'_1, X'_2, \ldots$, while the "additional/optional" data is denoted as $X''_0, X''_1, X''_2$. Mapping is done such that the X' data is mapped onto $y_{0,0}$ and $y_{1,0}$, while X" data is mapped onto $y_{2,0}$ and $y_{3,0}$.

Figure 6:
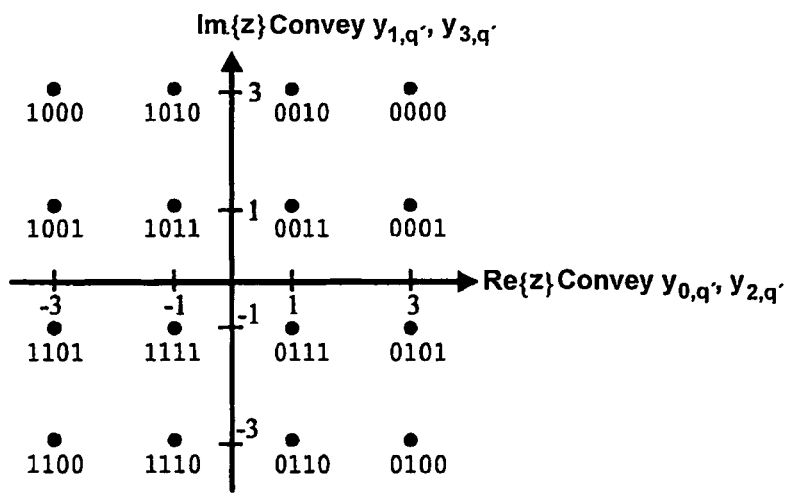
FIG. 6 illustrates a hierarchical modulation scheme using uniform 16-QAM.
Figure 7:
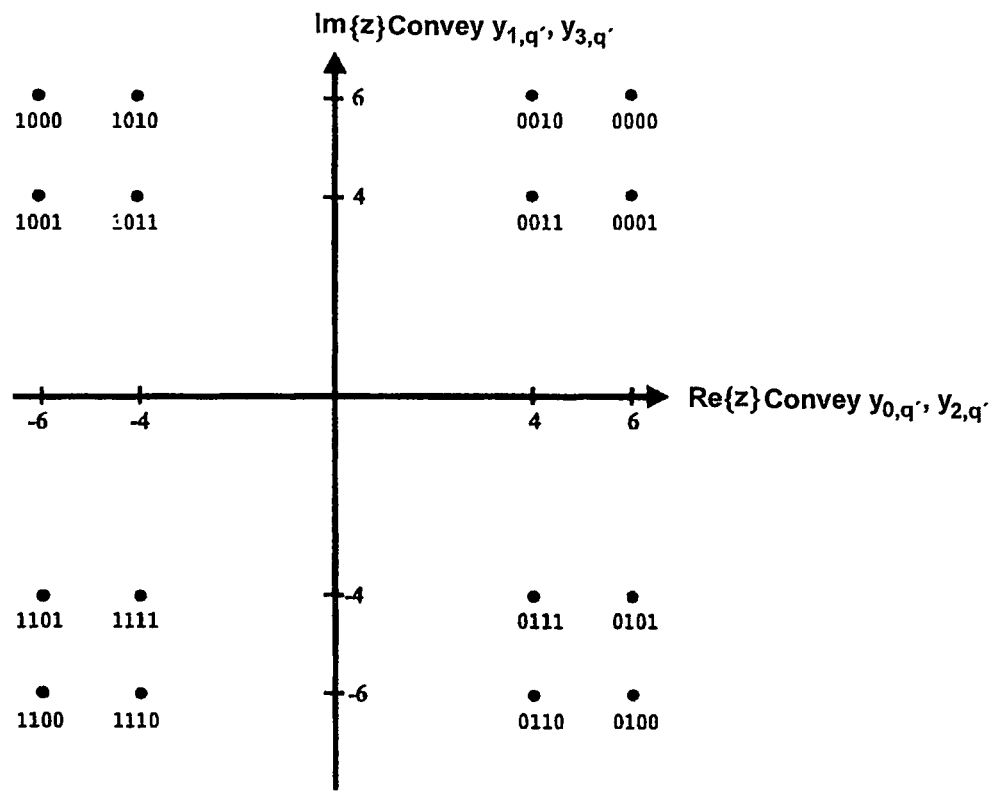
FIG. 7 illustrates a hierarchical modulation scheme using non-uniform 16-QAM.

Assuming a uniform 16-QAM constellation as shown in FIG. 6, there is already an inherent difference in error resilience between X' and X" data. This can be further increased by modifying the constellation for example as shown in FIG. 7. This puts more relative transmit power into the X' data and less relative transmit power into the X" data. Those skilled in the art will identify easily how the constellations have to be arranged to achieve a desired transmit power ratio.

It should be further apparent that such a non-uniform constellation can be chosen prior to feedback due to other knowledge available to the transmitter, with modification of such constellations as outlined above.

Further, it should be obvious to those skilled in the art that the available amount of data in such hierarchical modulation schemes does not necessarily correspond to the amount of data for the identified importance levels. In such a case, a preferable solution is to modify the classification into importance levels such that the amount of data of each importance level matches the amount of data available in each hierarchical modulation level. Alternatively, means such as puncturing or repetition of information, or modified channel coding, can be used to match the respective amount of data.

The invention claimed is:

1. A method of determining feedback in a communication system, the method comprising:
    mapping by a transmitting apparatus groups of bits of transmission data comprising data entities of different levels of importance to multi-level modulation symbols, wherein the bits of a respective data entity within each group of bits is mapped to a respective hierarchical part of the respective multi-level modulation symbol,
    transmitting the multi-level modulation symbols from the transmitting apparatus to a receiving apparatus,
    determining at the receiving apparatus for which data entities of the received data feedback should be provided, wherein said determining is based on (i) a decision which data entities are required and which data entities are optional to satisfy a quality of service (QoS) requirement, and (ii) the hierarchical parts of the respective multi-level modulation symbols that correspond to data entities required to satisfy the QoS requirement, and
    transmitting said feedback for only those data entities for which it has been determined that said feedback should be provided from the receiving apparatus to the transmitting apparatus to thereby satisfy said QoS requirement.

2. The method according to claim 1, wherein the levels of importance are predetermined or conveyed during setup of the transmission.

3. The method according to claim 2, wherein the required data entities will be transmitted with increased power, while the optional data entities will be transmitted with decreased power, such that the combined transmitted power remains unchanged.

4. The method according to claim 1, wherein the levels of importance are dynamically varied during the transmission and signaled from the transmitter to the receiver.

5. The method of claim 1, wherein the data entities of different levels of importance are assigned hierarchical transmission modes in multi-level modulation formats.

6. The method according to claim 1, wherein the communication system is a multi-cast transmission system comprising at least one data transmitting apparatus and multiple data receiving apparatuses.

7. The method according to claim 6, wherein the feedback is transmitted at least from one designated multicast receiving apparatus.

8. The method according to claim 7, wherein the feedback is transmitted by the multicast receiving apparatus only if a QoS criterion for at least one data entity of one level of importance has not been met.

9. The method according to claim 1, wherein the communication system is a wireless mobile communication system having a plurality of mobile receiving apparatuses with different qualities of the received data.

10. The method according to claim 9, wherein the feedback is transmitted by the multicast receiving apparatus only if a QoS criterion for at least one data entity of one level of importance has not been met.

11. The method according to claim 1, wherein the data is transmitted using MPEG data compression, comprising frames or pictures having different levels of importance.

12. The method according to claim 1, wherein the feedback signifies positive or negative acknowledgements of received data packets.

13. The method according to claim 1, wherein the feedback requests control of at least one of the transmission parameters including transmission power, coding gain, modulation, data rate and error probability.

14. The method according to claim 1, wherein an adjustment of a power ratio between the data entities of different importance levels is effected.

15. The method according to claim 14, wherein the required data entities are transmitted with increased power, while the optional data entities are transmitted with decreased power, such that the combined transmitted power remains unchanged.

16. The method according to claim 1, wherein for data entities of different importance levels, different modulation schemes are selected.

17. The method according to claim 1, wherein for data entities of different importance levels uniform and non-uniform signal constellations are selected.

18. The method according to claim 1, wherein a signal constellation employed for modulation is selected such that a desired error resilience of the data entities is translated into an arrangement of signal constellation points.

19. A receiving apparatus for use in a communication system comprising:
    a receiver section that receives multi-level modulation symbols,
    a de-mapping section that de-maps the multi-level modulation symbols to bits of a respective data entity within each group of bits, wherein the de-mapping section is adapted to de-map respective hierarchical parts of a respective multi-level modulation symbol to bits of a respective data entity within each group of bits,
    a determination section that determines for which data entities of the received data feedback should be provided, wherein the determining section bases the determination on (i) a decision which data entities are required and which data entities are optional to satisfy a quality of service (QoS) requirement, and (ii) the hierarchical parts of the respective multi-level modulation symbols that correspond to data entities required to satisfy the QoS requirement, and
    a transmitter section that only transmits said feedback for those data entities for which it has been determined that said feedback should be provided from the receiving apparatus to the transmitting apparatus to thereby satisfy said quality of service (QoS) requirement.

20. The receiving apparatus according to claim 19, further comprising a storage section that stores criteria which define levels of importance, or that stores the levels of importance, which are signaled from the transmitting apparatus.

21. A transmitting apparatus for use in a communication system comprising:
    a mapping section that maps groups of bits of transmission data comprising data entities of different levels of importance to multi-level modulation symbols, wherein the mapping section is adapted to map the bits of a respective data entity within each group of bits to a respective hierarchical part of the respective multi-level modulation symbol,
    a transmitter section that transmits said multi-level modulation symbols to a receiving apparatus, and
    a receiving section that receives feedback for only those data entities of the transmitted data for which the receiving apparatus has determined that said feedback should be provided to satisfy a quality of service (QoS) requirement.

22. The transmitting apparatus according to claim 21, further comprising a variation section which dynamically varies criteria defining the levels of importance, or the levels of importance, according to at least one of the transmission parameters including transmission power, coding gain, modulation, data rate and error probability.

23. The transmitting apparatus according to claim 22, wherein the transmitting apparatus uses MPEG data compression comprising frames or pictures having different levels of importance.

24. The transmitting apparatus according to claim 21, wherein the transmitting apparatus uses MPEG data compression comprising frames or pictures having different levels of importance.

25. A communication system comprising (a) a transmitting apparatus, and (b) a receiving apparatus according to claim 19.

26. The communication system according to claim 25, further comprising a classifying section that determines which data entities are required and/or are optional to satisfy a service requirement.

27. The communication system according to claim 25, wherein the receiving apparatus further comprises a storage that stores criteria which define levels of importance, or that stores the levels of importance, which are signaled from the transmitting apparatus.

28. The communication system according to claim 25, wherein the transmitting apparatus comprises a variation section that dynamically varies the criteria defining levels of importance, or the levels of importance, according to at least one of the transmission parameters including transmission power, coding gain, modulation, data rate and error probability.

29. The communication system according to claim 25, wherein the transmitting apparatus uses MPEG data compression comprising frames or pictures having different levels of importance.

30. A multicast transmission communication system comprising at least one data transmitting apparatus and multiple data receiving apparatuses according to claim 19.

31. A wireless mobile communication system having a plurality of mobile receiving apparatuses according to claim 19 receiving the data at different qualities.

* * * * *